INVENTOR.
JOHN J. VROLYK

ATTORNEY

INVENTOR.
JOHN J. VROLYK

BY Thomas S. MacDonald

ATTORNEY

United States Patent Office 3,233,458
Patented Feb. 8, 1966

---

3,233,458
HEAT FLUX TRANSDUCER
John J. Vrolyk, Granada Hills, Calif., assignor to
North American Aviation, Inc.
Filed Aug. 8, 1961, Ser. No. 130,121
8 Claims. (Cl. 73—190)

This invention relates to a heat flux transducer and more particularly relates to a heat flux transducer assembly which can be constructed and arranged to substantially identify itself with a heated wall member for effecting extremely accurate heat transfer measurements therethrough.

Present-day high temperature research and development work has pointed up an urgent need for the accurate determination of the rate of heat transfer from the hot gas side of a device to the exterior thereof. Prior attempts to fulfill such a need have been severely curtailed primarily for the fact that many devices, for example, a typical rocket engine combustion chamber, operate in a heat flux range of 0.1 to 10.0 B.t.u./in.$^2$ sec., and at chamber gas temperatures approximating the range of 4500–6000° F. The further fact that rocket engines generate severe vibrational forces during the actuation thereof, requires that the particular heat transfer sensing means utilized must not only be extremely accurate and efficient in function, but it must also be sufficiently rugged in construction to withstand such forces.

Heretofore, such a heat transfer measuring function in rocket engines was primarily accomplished in accordance with the following discussion. Water was passed through a conduit, wrapped around the chamber wall of a combustion chamber. The temperature rise and flow rate of such a cooling medium was measured, and the heat transfer rate was then calculated. Such a calculation necessarily evolved an average value, since local variations in heat transfer could not be accurately determined. Attempts then were made to cope with this particular problem by using several pieces of such conduit, each with its own water supply. With such a duplicated type system it was found that an advantageous reduction in the area over which the heat transfer rate was averaged was obtained. However, such individual areas were still relatively large. Further, such measuring means were extremely bulky in construction, thus resulting in a relatively slow response factor. Such systems were also easily susceptible to failure. Also, the data derived therefrom had to be reduced, sometimes with the aid of a computer. A further disadvantage was that in case of failure, new hardware had to be built therefor.

The heat flux transducer comprising the novel aspects of this invention has overcome many of the above-stated prior art inadequacies. Such a transducer essentially comprises a first planar surface adapted to be heated, a first thermocouple means substantially forming a plane constructed and arranged a fixed distance from said first planar surface and substantially in parallel relationship thereto and a second thermocouple means substantially forming a plane constructed and arranged a fixed distance from and substantially parallel with respect to the plane formed by said first thermocouple means. With such a construction, extremely accurate rate of heat transfer measurements may be obtained.

An object of this invention is to provide a heat flux transducer which is efficient in operation and rugged in construction.

Another object of this invention is to provide an economical heat flux transducer assembly which is relatively miniaturized and simple in construction.

A further object of this invention is to provide a heat flux transducer wherein the indicated output can be directly read in units of heat transferred per unit area per unit time.

These and other objects of this invention will become apparent from the following description taken in connection with the accompanying drawings, in which.

Figure 1:
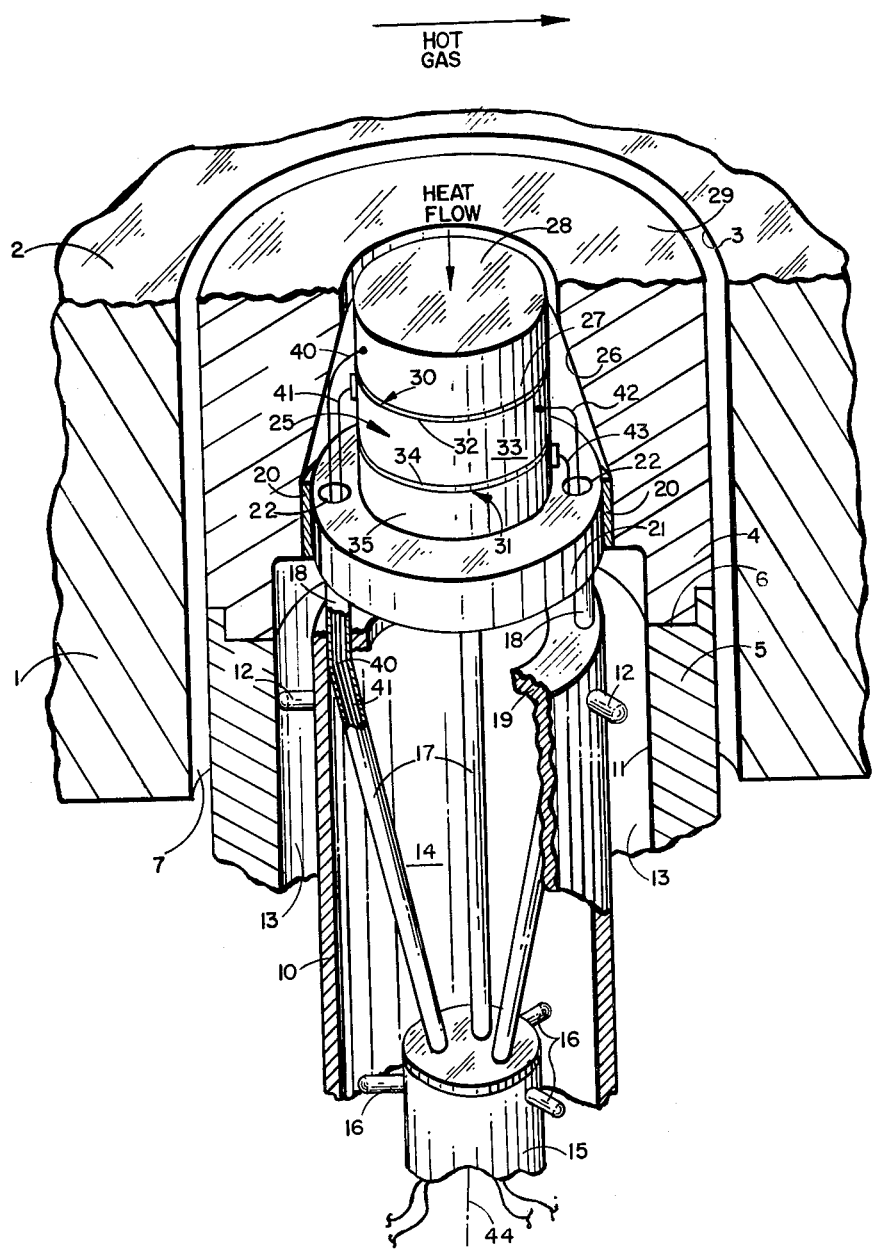
FIG. 1 is a partly sectioned elevational view, disclosing a heat flux transducer assembly employing the novel concepts of this invention.

FIG. 1 is a partly sectioned, elevational view disclosing the novel concepts of this invention. A heated wall member 1 is shown as comprising a surface portion 2 which functions to form part of the inside surface of a combustion chamber of a rocke engine, for example. In most combustion chamber designs, such a surface portion whereat the heat transfer measurements are to be taken, generally comprises a cylindrical configuration. However, it should be understood that the novel concepts of this invention are equally adapted for use with heated wall members which comprise other internal surface configurations. For example, the internal surface of the combustion chamber could comprise a flat configuration.

As hereinbefore stated, it is extremely desirable to determine the heat transfer rate through such a rocket engine wall member 1, which heat is generated by a hot exiting gas, as illustrated. A bore 3, comprising any desired diameter depending on the particular work application (for example, 0.5 in.), is formed through the side wall 1 of the rocket motor combustion chamber and is adapted to contain a heat flux transducer probe comprising the novel aspects of this invention therein.

The heat flux transducer assembly comprises an outer preferably cylindrical casing member consisting of two intergrated sections 4 and 5. The casing preferably consists of two sections in order to provide for expeditious removal and replacement of the internally contained heat flux transducer structure. The connecting, preferably stepped down, portion 6 which is thus formed therebetween may comprise conventional thread or weld means, or the like. The casing may comprise any standard steel alloy such as No. 321 stainless steel, for example, which is capable of withstanding extreme environmental temperatures in the range of 4500–6000° F. The degree of clearance 7, which is provided between the wall 1 and the casing member, also depends on the particular design requirements. Functionally, such a clearance should be small enough to prevent undue hot gas flow therethrough, but yet be large enough to provide for expeditious insertion of the heat flux transducer therein.

The heat flux transducer assembly further comprises a tubular shaped inner casing member 10, also preferably having a cylindrical configuration. The member 10 is constructed and arranged within a bore 11 formed in the section 5 of the casing and is adapted to be secured therein by means of conventional welding techniques, or the like, which may be conveniently applied to three or more lug members 12 (only two are shown). The lug members 12 assure that the outer wall portions of the cylindrical member 10 are constructed and arranged a predetermined fixed distance from the wall formed by the bore 11 to thus provide an exit or first passage means 13. The exit passage means 13 is adapted to receive and guide a coolant constituent flow therethrough, as will be hereinafter more fully expained. The cylindrical member 10 is further constructed and arranged to form an internal bore 14 which functions to provide an inlet or second passage means for further guiding said cooling constituent.

The passage 14 is further adapted to house a wire lead containing structure 15 therein by means of three or more radially projecting lug members 16. Such lug members may be secured by conventional welding means, or the like, to the cylindrical member 10. Three preferably upwardly and outwardly extending conduit members 17 are secured to member 15 in the conventional manner and terminate at their upper ends in three upstanding conduit portions 18, which portions are constructed and arranged to extend through a ledge portion 19 formed on the cylindrical casing 10. The ledge 19 is arranged to form a nozzle-like opening for purposes hereinafter explained. Braze or weld means 20 function to secure member 21, which is preferably formed in the shape of a disc or collar, to section 4 of the casing member, as shown. The member 21 is further secured to the upstanding conduit portions 18. Member 21 provides three radially spaced bores 22 therein (only two are shown) which cooperate with the passageways of the conduit portions 18, as shown. Thus, it can be readily seen that with the hereinbefore described electrical lead containing structure means, wire leads may be passed in a shielding manner from the top surface of the member 21, down through the conduits 17, below the member 15 and into a standard temperature recording device.

The above-mentioned member 10, lead containing structure 15, and conduits 17 may comprise any standard stainless steel constituent, for example, which constituent is adapted to withstand the predetermined adverse environments to which the assembly will be subjected. The member 21, however, is preferably constructed of the same preferably high heat-conducting type material utilized to form the major parts of the hereinafter described heat flux transducer.

To fulfill the heat flux transducing function a laminated heat transfer indicating means or heat flux transducer, generally noted at 25, is constructed and arranged within a substantially conically shaped cutout portion 26 formed in the outer casing section 4. The cutout portion 26 may be filled with a standard insulation (not shown) such as fiberglass, if so desired. It is particularly desirable to insulate the inner sensitive type workings of the heat flux transducer 25 from the heat generated by the hot gas flow, as well as to provide an electrical insulating means therein. The laminated heat transfer indicating means is shown in substantially stacked relationship and comprises a first member 27 preferably having a disc shape, as shown. The member 27 provides a forward, preferably planar, surface 28 thereon which is preferably constructed and arranged in substantially flush relationship with respect to the forward surface 29 of the outer casing section 4. The surface 28 is also preferably arranged flush relative to the inner surface of the combustion chamber. With such a construction and arrangement it can be readily seen that the flush surface 28 of the disc member 27 substantially identifies itself with the surface 2 of the combustion chamber in order to aid in the prevention of any undue turbulence therein. Also, such a substantial identification of the member 27 provides that such member reacts in substantially the same heat conducting manner as the wall 1 with respect to the heat generated by the hot gas flow.

Respective first and second thermocouple means, generally noted at 30 and 31, are preferably constructed and arranged to have their operative thermocouple surfaces constructed and arranged substantially parallel with respect to the flush surface 28 of disc member 27. As will be hereinafter more fully explained, the thermocouple means 30 and 31 are relatively thin in construction. Therefore, for purposes of expressing this invention, such thermocouple means will be herein stated as being constructed and arranged substantially in planes parallel to the forward surface 28 of member 27. The first thermocouple means 30 structurally provides two distinct thermocouples. A relatively thin leaf member or layer 32 and a second disc member 33 provide for such a dual thermocouple function in combination with the disc member 27 as will be hereinafter more fully explained. In a like manner the second thermocouple means 31 comprises a second relatively thin leaf type layer 34 which is constructed and arranged between the second disc member 33 and a third disc member 35 to provide two distinct thermocouples.

The lower base portion of disc member 35 may be secured to the member 21 by means of any conventional welding techniques, or the like. As hereinabove stated, the member 21 may be selectively formed in the shape of a solid disc or collar. If a solid disc member is used therefor, the member 21 may be constructed and arranged to have the lowermost surface portion thereof (not shown) exposed to chamber 14 to provide for a cooling function as will be hereinafter more fully explained. However, if a collar shape is chosen therefor, the lowermost surface portions (not shown) of the disc member 35 may be constructed and arranged to provide such a function. Also, it should appear obvious that the disc member 35 may be alternatively preformed as an integral part of the plate member 21 by conventional casting and fabrication techniques or the like. In any event, it is desired to provide a surface portion of the transducer which is exposed to the chamber 14, i.e., a surface portion which will transmit, by conduction, the cooling effects obtained from chamber 14.

The disc members 27, 33, and 35, as well as the plate member 21, may comprise a constituent such as copper, aluminum, or the like, which constituent preferably affords a relatively high heat conductance factor. The respective adjacent thin leaf type members 32 and 34 may comprise a conventional constantan constituent, for example, which will function in combination with the disc members 27, 33, and 35 to afford the desired thermocouple functions. Such a combination is particularly usable in rocket engine combustion chamber applications wherein the chamber temperatures approximate the range of 4500–6000° F. For higher temperatures, it is possible to utilize other standard thermocouple material combinations such as tungsten-rhenium, tungsten-tantalum, or iridium-rhodium. For intermediate temperatures, such a thermocouple combination may comprise iron-constantan or chromel-alumel, for example.

As will be hereinafter more fully explained, the particular construction and arrangement, i.e., the thickness, diameters, particular cross-sectional configurations and type of material, etc., of the respective thermocouple elements comprise design parameters which are a matter of choice depending on the particular heat transfer functions desired. For example, it has been found that for most workable applications the disc members 27, 33, and 35 may comprise a thickness in the range of 0.001 inch to 0.5 inch, whereas the leaf members 32 and 34 may comprise a thickness selected from the range of 0.001 in. to 0.01 in. Such thicknesses primarily depend on the type of material utilized, the range of heat fluxes to be measured, and the time response desired.

Figure 3:
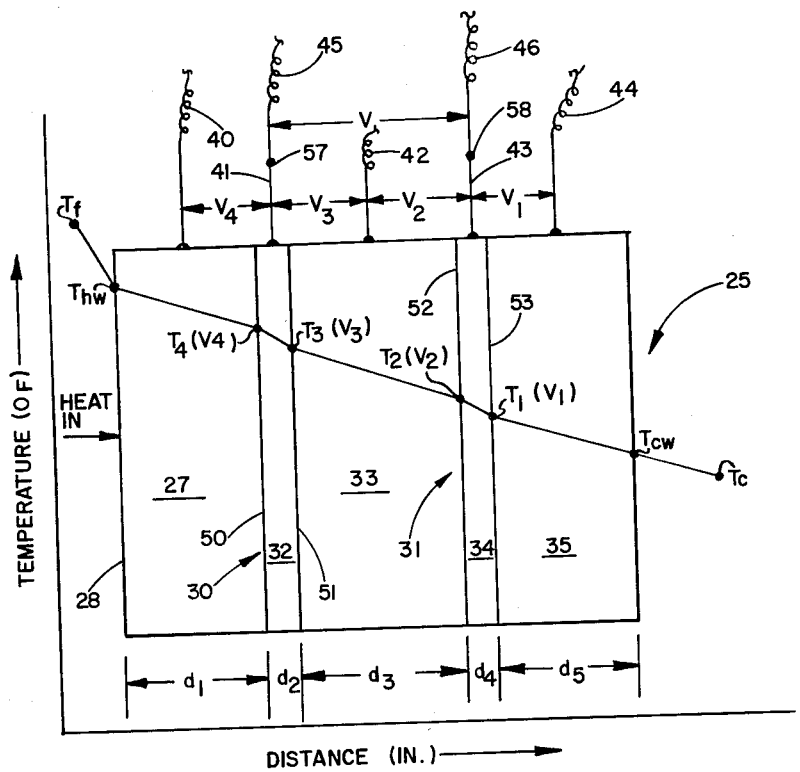
FIG. 3 is a theoretical showing more particularly disclosing the novel heat transfer measuring concepts of this invention.

In order to operatively connect the thermocouples of the heat flux transducer 25 to the proper recording apparatus, a plurality of insulated electrical lead members, preferably in the form of wires, are utilized. A first lead wire 40 is preferably fixedly secured to the approximate mid-portion of the disc member 27 and extends into and through a first of the conduits 17, as shown. The lead wire 40 is thus adapted to be secured to a standard recording means. A second lead wire 41 is secured to the leaf member 32 and extends through the same conduit 17 as wire 40, as shown. A third lead wire 42 is operatively connected to the substantial mid-portion of disc member 33 and extends through a second of the conduit members 17, with a fourth lead wire 43 which is operatively connected to the leaf member 34. As shown in FIG. 3, a fifth lead wire 44 is operatively connected to the approximate mid-portion of the third disc member 35, and extends through a third conduit member 17 and is also adapted to be operatively connected to the recorder. In each of the above cases, the lead wire is preferably of the same material as the material of the member to which it connects. FIG. 3 further discloses leads 45 and 46 which extend from leads 41 and 43 for purposes hereinafter more fully set forth.

Figure 2:
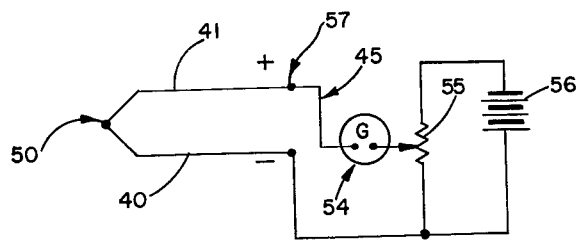
FIG. 2 illustrates a conventional circuit which may be utilized with the heat flux transducer assembly of FIG. 1.

FIG. 2 discloses a conventional circuit which may be utilized as a heat output measuring means to measure the output of the hereinafter more fully discussed thermocouples. It should be noted in FIG. 3 that the laminated heat transfer indicating means 25, comprising the members 27, 32, 33, 34, and 35, provides for four distinct thermocouples which are shown at 50, 51, 52, and 53 therein. Referring again to FIG. 2, it should be noted that the thermocouple 50, for example, is operatively connected to a standard galvanometer 54, potentiometer 55, and battery 56 in a conventional manner. Thus, a direct conversion of the temperature sensed at thermocouple 50 provides that the same may be read in terms of voltage output. In accordance therewith and as will be hereinafter more fully explained, the novel concepts of this invention are adapted to have the temperature difference between $T_3$ and $T_2$ (FIG. 3), for example, directly obtained as a millivolt output to thus enable a recorder to be calibrated and read directly in units of B.t.u./sec. in.$^2$.

Referring again to FIG. 3, it should be noted that the first pair of thermocouples 50 and 51 comprises the first thermocouple means 30 and a second pair of thermocouples 52 and 53 comprises the second thermocouple means 31. As illustrated, such thermocouples are adapted to generate potential differential V, $V_1$, $V_2$, $V_3$, and $V_4$. Under normal operational conditions, temperatures of the thermocouple junctions 50–53 are preferably maintained above the temperatures of cold junctions 57 and 58. In case members 27, 33, and 35 are made of a material other than copper, additional cold junctions must be located in leads 40, 42, and 44, in addition to cold junctions 57 and 58. The construction and arrangement of such cold junctions and the particular desired functions thereof are well known in the art.

Under the above-described conditions four voltmeters or potentiometers can be used to measure the four respective voltages $V_1$, $V_2$, $V_3$, and $V_4$. It would be found that leads 41 and 43 would be negative with respect to lead 42, lead 44 would be positive with respect to lead 43 and lead 40 would be positive with respect to lead 41. Also, when voltage $V_2$ is subtracted from voltage $V_3$, the difference therebetween represents the difference in temperature between the thermocouple junctions 51 and 52. Thus, only the voltage V need be measured since this voltage represents the difference between the voltages $V_2$ and $V_3$. It should be further noted that the heat transfer rate, as hereinbefore stated, is directly proportional to this difference in voltage.

It is believed that a brief theoretical analysis of the novel concepts of this invention would be advantageous at this point. Considering the disc member 33 to comprise a substantially pure copper right cylinder, as shown in FIG. 3, and further assuming that the member 27 is heated at one end and cooled at the other end thereof, the following heat transfer rate equation therefor should be noted:

$$\frac{q}{A}=\frac{k(T_3-T_2)}{d_3}$$

wherein:

A = cross-sectional area of the cylinder (ft.$^2$);
$d_3$ = distance between two points along the side of the cylinder (ft.);
$T_3-T_2$ = temperature difference across a distance, $d_3$ (° F.);
$k$ = the thermal conductivity of the particular conductor constituent employed (B.t.u./hr./ft.$^2$/unit temperature gradient, ° F./ft.); and
$q$ = heat transfer rate (B.t.u./hr.)

Thus, it can be readily seen that by employing the differential thermocouple effects afforded by thermocouples 51 and 52, that the temperature difference $T_3-T_2$ can be directly obtained as a millivolt output. In accordance therewith, a recorder can be calibrated to read directly in units of B.t.u./sec. in.$^2$. It can be further seen that the heated wall temperature $T_{hw}$ can also be determined along with the heat transfer coefficient, $h_g$. Such a statement would appear to be well taken since:

$$\frac{q}{A}=h_g(T_f-T_{hw})$$

where:

$h_g$ = the heat transfer coefficient $\left(\frac{Btu.}{hr.\,ft.^2\,°F}\right)$ $T_f$ = the effective flame temperature, usually determined by other means (° F.); and
$T_{hw}$ = the temperature of the heated wall (° F.)

However, if $h_g$ becomes known for a given combustor, a measure of the flame temperature $T_f$ becomes possible by using the same formula.

As hereinbefore stated, selected combinations of the thermocouples 50–53 may be utilized to provide for various millivolt outputs. It should be further noted, as more clearly shown in FIG. 1, that the temperature ($T_{cw}$) occurring at the rearmost wall portion of the heat flux transducer 25 can be maintained at any desired temperature by the cooling means essentially comprising passages 13 and 14 by using a cooling constituent therein, such as water having a temperature $T_c$. The coolant can be directed upwardly into the passage 14 and imparted onto the exposed face of plate member 21 and/or disc member 35 by means of the nozzle-like opening formed by ledge 19. Such a cooling constituent is then free to flow down through the outer passage 13 formed by means of bore 11. Thus, the rearmost wall portion of the transducer may be maintained at a relatively constant temperature $T_{cw}$, to assure full operability of the system even at extremely high engine operating temperatures.

Figure 4:
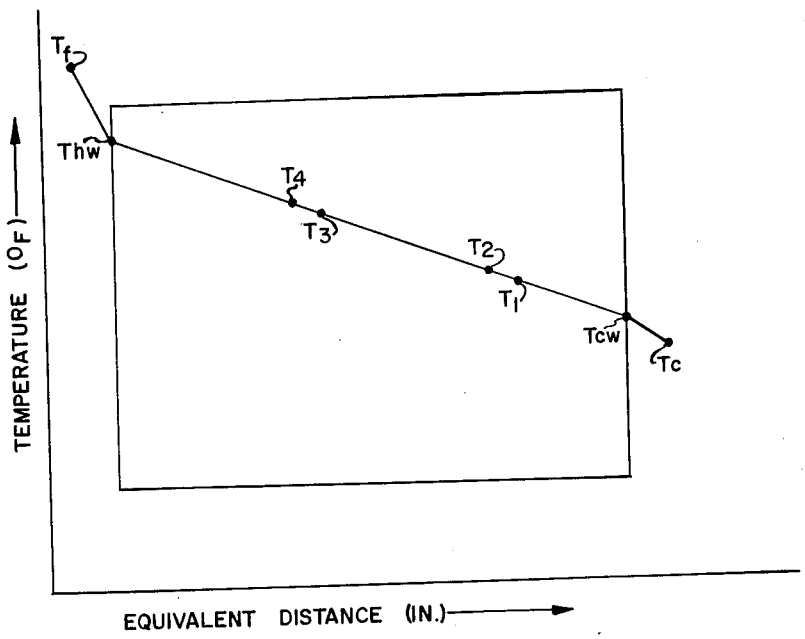
FIG. 4 is a second theoretical showing, similar to FIG. 2.

FIG. 4, when viewed in view of FIG. 3, discloses that for a given time the temperature comprises a linear function relative to the distance travelled through a member comprising the same constituent, such as copper, for example. More particularly, FIG. 4 discloses the theoretical heat transfer relationship between a cylinder comprising a single constituent and the laminated structure of FIG. 3. It should be noted in FIG. 3 that, should the disc members 27, 33, and 35 be chosen to comprise copper and the leaf members 32 and 34 to comprise a constantan constituent, since the heat conductivity of copper is approximately 17 times that of constantan, standard calculations will afford a linear temperature function similar to that shown in FIG. 4, for example. Thus, the above discussed parameters may be easily determined.

It should be particularly noted that by knowing the particular linear dimensions of the disc members 27, 33, and 35 ($d_1$, $d_3$, and $d_5$) and the leaf members 32 and 34 ($d_2$ and $d_4$), and by additionally ascertaining the heat transfer coefficients thereof, that it is possible to calculate the overall heat transfer rate through the composite structure.

Furthermore, since the thickness $d_1$ of the disc member 27 is accurately known (FIG. 3), the surface temperature $T_{hw}$ on the hot gas side thereof can be accurately calculated. Also, if the flame or hot gas temperature $T_f$ is known, it is then possible to calculate a value for the local gas-side heat transfer coefficient. Conversely, if a value of a gas-side heat transfer coefficient is assumed, the flame or gas temperature $T_f$ can then be determined. Also, as hereinbefore stated, electronic type means can be provided for automatically and expeditiously performing the necessary calculations so that the indicated output can be read directly in units of heat transferred per unit area per unit time.

Such a hereinbefore described heat flux transducer could also be utilized as an indirect means for measuring the flame temperature of a rocket engine, provided that it be empirically calibrated for use restricted to a particular engine under a particular set of operating conditions. Such further utility is primarily based on the fact that a particular heat transfer rate is dependent upon the gas temperature provided that the turbulence, gas velocity, and wall surface conditions can be assumed constant or to be at least some well behaved function of temperature. An example wherein the assumptions mentioned above are best warranted is in a rocket engine of the nuclear type using a reactor to heat hydrogen gas in the combustion chamber thereof.

It should be further understood that the novel concepts of this invention may be employed for extremely high temperatured environments, as briefly hereinbefore stated. During such applications it may be desirable to use a cooling fluid such as liquid sodium, lithium, or potassium, or any other such liquid metal which provides an efficient cooling means at such high temperatures. Such a liquid type metal could be sprayed onto the coolant exposed surface of member 21, or as hereinbefore stated, directly onto the disc member 35. A vaporized metal would thus be created which vapor could then be conducted away in hereinbefore described manner. The latent heat of vaporization of such liquid metals, as well as any liquid metal heat capacity, could be used to cool the sensitive type elements.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A heat flux transducer comprising a body having a forward end surface to be heated and a backward end surface to be maintained at a temperature less than that to which said forward end surface is heated, the body being formed of at least five sections arranged in a series extending between said ends with each section being joined directly to its next adjacent section, the composition of matter of each of the second of said sections from said ends respectively being different from that of each of the other of said sections, each of said other sections being discs of from 0.001 to 0.5 inch thick, each of said second sections being relatively thin layers, each of said second sections forming respective thermocouples with each of their next adjacent sections, and two lead wires connected directly to said second sections respectively for connection to measuring means responsive to the electrical potential between them, each of said wires being of the same composition of matter as that of the said section to which it is directly connected.

2. A heat flux transducer according to claim 1 in which said other sections are of a common composition of matter and said second sections are of a common composition of matter.

3. A heat flux transducer according to claim 1 in which the number of said sections is five, the first, third and fifth sections being formed of copper, and the second and fourth sections being formed of constantan.

4. A heat flux transducer comprising a cylindrical body having a forward end surface to be heated and a backward end surface to be maintained at a temperature less than that at which said forward end surface is heated, the body being formed of five sections arranged in a series extending between said ends with each section being joined directly to its next adjacent section, the composition of matter of each of the first, third, and fifth sections being the same and being different from that of the second and fourth sections, said first, third and fifth sections being discs of from 0.001 to 0.5 inch thick, said second and fourth sections being layers of less thickness than said discs, said second section forming respective thermocouples with each of said first and third sections, said fourth section forming respective thermocouples with each of said third and fifth sections, five lead wires connected directly to said sections respectively for connection to measuring means responsive to the electrical potential between any pair of said wires, each of said wires being of the same composition of matter as that of the section to which the wire is directly connected, and means for maintaining said backward end surface at a constant temperature.

5. A heat flux transducer assembly wherein thermocouple materials are stacked, in combination with a thermo-electric heated wall member having an aperture therein, said wall member forming an internal surface portion, said assembly arranged in said aperture and comprising an outer cylindrical casing member, said casing member terminating in a forward surface portion which is arranged substantially flush relative to the internal surface portion of said wall member, a heat flux transducer constructed and arranged in said cylindrical casing member and comprising first, second, and third disc shaped members in stacked relationship and adjacent first and second leaf-like layers constructed and arranged between said first and second disc shaped members and said second and third disc shaped members, respectively, said disc shaped members and said layers all forming planar surfaces which are substantially parallel to said forward surface portion of said casing member, the forward surface of said first disc shaped member being constructed and arranged in substantially flush relationship with respect to the internal surface portion of said wall member.

6. The invention of claim 5 further comprising cooling means operatively connected to said heat flux transducer for maintaining said third disc shaped member at a predetermined constant temperature.

7. The invention of claim 5 further comprising means operatively connected to at least one disc shaped member and an adjacent leaf-like layer for measuring the electric potential therebetween.

8. A heat flux transducer assembly comprising an outer casing member constructed and arranged to form a forward planar surface portion, a heat flux transducer secured in said casing member, said transducer comprising first, second and third disc shaped members in stacked relationship and first and second thermocouple means constructed and arranged between said first and second members and said second and third members, respectively, said first and second thermocouple means each in substantially parallel relationship relative to each other, an inner casing member arranged adjacent to said third member, said inner casing member secured in said outer casing member to form a first passage means therebetween for guiding a cooling constituent therethrough and a second passage means in said inner casing member cooperating with said first passage means for guiding said cooling constituent therethrough, said first and second passage means constructed and arranged to impart said cooling constituent onto said third member to maintain said third member at a predetermined constant temperature.

References Cited by the Examiner

UNITED STATES PATENTS

| | | | |
|---|---|---|---|
| 2,997,513 | 8/1961 | Rall et al. | 73—359 X |
| 3,018,663 | 1/1962 | Dunlop | 73—341 |

FOREIGN PATENTS 587,996  5/1947  Great Britain.

OTHER REFERENCES

Article entiled "New Look at Temperature-Measuring Transducers," by F. Yeaple; from Product Engineering, vol. 32, No. 21, May 22, 1961, page 52; copy in 73–362.

RICHARD C. QUEISSER, *Primary Examiner.*

ROBERT EVANS, JOSEPH P. STRIZAK, *Examiners.*